United States Patent [19]
Gvelesiani et al.

[11] 4,055,315
[45] Oct. 25, 1977

[54] DEVICE FOR PIPELINE TRANSPORTATION OF LOADS BY FLUID FLOW

[76] Inventors: Konstantin Shalvovich Gvelesiani, ulitsa Pekina, 21, kv. 84; Zauri Mikhailovich Kadzhelashvili, ulitsa Mikeladze, 20, kv. 12; Alexandr Shalvovich Tskvitinidze, poselok TEVZ, kvartal 11, korpus 30, kv. 71; Otari Shalvovich Tusishvili, ulitsa Telavskaya, 17; Andrei Illarionovich Sherezadashvili, ulitsa Saakadze, 24; Gamlet Varlamovich Khabuliani, prospekt Vazha-Pshavela, kvartal IV, korpus 3, kv. 7; Lia Nakhshonovna Bakhanova, ulitsa Lermontova, 1; Otari Vardenovich Tatishvili, Gldansky massiv, I mikroraion, korpus 20a, kv. 83, all of Tbilisi, U.S.S.R.

[21] Appl. No.: 676,713

[22] Filed: Apr. 14, 1976

[51] Int. Cl.² ............................................. B65G 51/06
[52] U.S. Cl. ................................. 243/33; 104/138 R; 243/39
[58] Field of Search ...................... 243/33, 39, 32, 38; 15/104.06 R; 104/138 R, 138 G, 155; 105/365; 302/2 R, 14

[56] References Cited

U.S. PATENT DOCUMENTS

3,890,905   6/1975   Clavin .............................. 104/138 G

Primary Examiner—Evon C. Blunk
Assistant Examiner—Jeffrey V. Nase
Attorney, Agent, or Firm—Fleit & Jacobson

[57] ABSTRACT

A device for use in liquid or gas pipelines comprising a turbine wheel mounted on a body with the blades of the turbine wheel being set at an acute angle with respect to the direction of fluid flow. At least one row of supporting rollers are connected to the turbine wheel with the axles of these rollers set at an angle $\beta$ with respect to the direction of movement of the device in the fluid flow, and another row of supporting rollers are mounted on the body, with all supporting rollers having freedom to move radially with respect to the axis of the pipeline.

12 Claims, 18 Drawing Figures

DEVICE FOR PIPELINE TRANSPORTATION OF LOADS BY FLUID FLOW

The present invention relates to pipeline transportation and more particularly, to devices for transportation of loads in a pipeline by the flow of fluid.

The device according to the present invention will be used most successfully in pipelines carrying liquid materials, such as petroleum, petroleum products, water, etc.

It is also possible to employ such devices in gas-carrying pipelines.

Not less successfully the device according to the invention will be used in pipelines wherein the liquid or air serve as a working fluid only, intended to move the device according to the invention.

The device according to the invention will be used most successfully as a prime mover for containers combined into trains.

These devices can also be easily adapted for carrying supervisory instruments, equipment for cleaning the inside surface of the pipeline and other appliances utilized for preventive maintenance and repairs of the pipeline interior.

Known in the prior art are devices for transportation of containerized loads through a pipeline by the pressure of compressed air. These devices comprise a body with supporting rollers installed at the opposite ends of said body. The rollers at each end of the body make up a row wherein said rollers are equispaced around the circumference with a provision for radial movement relative to the pipeline axis. The body is provided with cups sealing off the gap between the body and the inside surface of the pipeline.

The above-described devices are capable of transporting loads through a pipeline under the pressure of compressed air only in the direction of air flow.

Besides, widely known are containers (capsules) in the form of elastic shells filled with the transported material and moved through a pipeline by the carried petroleum in the direction of its flow.

In both above-mentioned cases empty containers can be returned to the loading site by either providing an additional pipe branch or by changing the direction of the fluid flow, or else, by the use of another type of transportation (by rail, water, motor trucks, aircraft). All these factors raise the cost of pipeline transportation considerably.

Another disadvantage of the known devices lies in a considerable increase in power consumption required for moving said devices through the pipeline sections inclined at a gradient exceeding 3°.

Still another disadvantage of the known devices lies in the danger of emergency situations in the inclined sections of the pipeline when the fluid flow ceases for some reason.

The main object of the present invention is to provide a device for transportation of loads through pipelines whose design would allow moving the loads both along and against the flow by using a part of the flow energy.

Another object of the present invention lies in stepping up the efficiency of a single pipeline carrying gas, petroleum or other fluid media.

Still another object of the present invention lies in providing a device whose design would allow its movement through pipelines with minimum power expenditures at practically any gradient.

A further object of the present invention is to provide a device which would stop in inclined sections of the pipeline without the use of any additional appliances when the fluid flow ceases, thus precluding completely the uncontrollable rolling down and, consequently, emergency situations in the pipeline.

In accordance with these and other objects a device is proposed for pipeline transportation of loads by the flow of fluid.

Said objects are accomplished by providing a device for pipeline transportation of loads by the flow of fluid, comprising a body with supporting rollers arranged on said body at least in two rows and capable of moving radially with respect to the pipeline axis, wherein, according to the invention, the body mounts a turbine wheel whose blades are set at an acute angle to the direction of fluid flow while the axles of each supporting roller at least in one row are mechanically coupled to said turbine wheel and are set at an angle to the fluid flow, the value of said angle depending on the desired direction of movement of the device in the fluid flow.

If the device is to move against the fluid flow, it is necessary that the angle between the axle of each supporting roller and the direction of the fluid flow should not exceed 30°.

This angle between the axles of the supporting rollers and the direction of the fluid flow will ensure optimum thrust.

It is practicable that the turbine wheel should be secured on the body and the axles of the supporting rollers in one row should also be coupled to the body through intermediate links.

This layout of the device is simplest from the viewpoint of design and can be employed for the transportation of loads which may be turned over.

It is no less practicable that the turbine wheel be installed on the body with a provision for rotating relative to same.

This device will be useful for the transportation of loads which must not be turned over.

It is possible to connect the axle of each supporting roller in one row with the turbine wheel through an intermediate link.

This is the simplest method of connecting the supporting rollers with the turbine wheel.

It is practicable that each side of the body would be provided with one blade secured essentially in a horizontal plane with the blade backs pointing upward and the leading edges directed against the fluid flow.

The provision of such blades reduces the influency of the weight of the load-carrying device on the supporting rollers.

It is practicable that the device should be provided with an additional turbine wheel installed on the body after the main turbine wheel in the direction of the fluid flow, said additional wheel being capable of rotating relative to said body, and with an additional row of supporting rollers whose axles be coupled to said additional turbine wheel by intermediate links.

This design of the device will increase the traction force by straightening the fluid flow with the aid of the additional turbine.

It is no less practicable that the device should be provided with an additional turbine wheel installed on the body after the main turbine wheel in the direction of the fluid flow, said additional wheel being capable of rotating relative to said body and connected with said main turbine wheel and with the axles of the supporting rollers in one row through a differential mechanism.

This design of the device makes it possible to result the forces created by both turbine wheels in one row of the supporting rollers, thus increasing the traction force.

It is quite reasonable that the turbine wheel should be connected with the axles of the supporting rollers in one row through the links of a kinematic chain.

Such devices are recommendable for use in gas-carrying pipelines since said devices increase the traction forces on the supporting rollers.

It will also be useful to secure a blade to one side of the body in an essentially horizontal plane with the blade back pointing upward and the leading edge directed against the fluid flow.

The provision of one blade prevents the body from turning around its longitudinal axis under the effect of the torque caused up by the turbine wheel and at the same time creates a lifting force.

It is desirable that the intermediate link connecting the axle of each supporting roller with the turbine wheel should be made in the form of a part curved in the plane of the transverse axis of the supporting roller one end of said part being provided with a fork for fastening said axle, while its other end should have a trunnion installed in the turbine wheel with a provision for turning around its axis while the device moves in the direction of fluid flow and fastened rigidly to it when the device moves against the fluid flow.

This construction of the intermediate link ensures self-orienting of the supporting rollers while the device moves along the fluid flow.

The devices for the pipeline transportation of loads by the flow of fluid according to the present invention can be moved by the fluid flow both along and against the flow thus permitting these devices to be moved from the loading site to the point of destination and be returned through the same pipeline. This, in turn, increases the efficiency of pipeline transportation.

Now the invention will be described in detail by way of examples with reference to the accompanying drawings in which:

FIG. 12 is a view along arrow "C" in FIG. 11;

FIG. 13 is a view along arrow "D" in FIG. 9;

The device for the transportation of loads through a pipeline 1 (FIG. 1) comprises a body 2 which mounts blades 3 rigidly secured at equal spaces around the circumference, said blades having an aerofoil profile (not shown in the drawing) and forming, together with the body 2, a turbine wheel 4. At the side of their leading edges the blades 3 are set at an acute angle "$\alpha$" to the direction "H" of fluid flow, the fluid in this particular example being a liquid.

Figure 1:
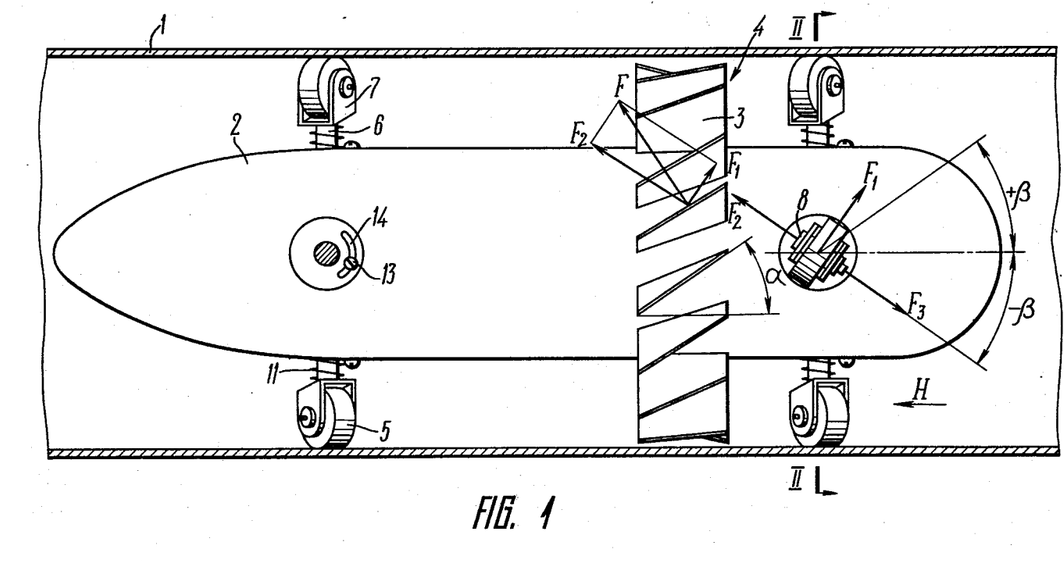
FIG. 1 is a general view of the device for pipeline transportation of loads according to the invention.

Angle "$\alpha$" i.e. the angle of attack, is defined by the direction "H" of the fluid flow and the chord passing through the leading and trailing edges of the blade 3.

Figure 2:
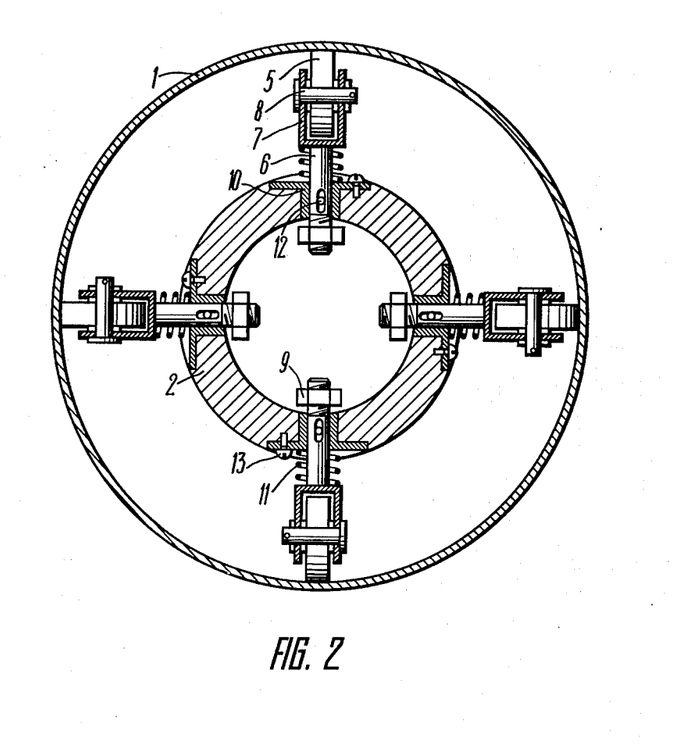
FIG. 2 is a section taken along line II—II in FIG. 1 with the supporting rollers turned for convenience through angle "$\beta$"

Installed on the body 2 at the opposite sides from the turbine wheel 4 are two rows of supporting rollers 5 whose position in FIG. 1 corresponds to the movement of the device against the liquid flow. In each row the supporting rollers 5 are equispaced around the circumference. Each supporting roller 5 in each row is connected with the body 2 through an intermediate link 6. One end of the intermediate link 6 is provided with a fork 7 (FIG. 2) for installing the axle 8 of the supporting roller 5. The other end of the intermediate link 6 is threaded and provided with a screwed-on nut 9. The intermediate link 6 is installed on the body 2 so that it is capable of moving radially relative to the axis of the pipeline 1 in guides 10 fixed on the body 2. The supporting rollers 5 are constantly pressed against the inside surface of the pipeline 1 by springs 11 located on the intermediate link 6 between the body 2 and the fork 7. The guides 10 are connected with the link 6 by a key joint 12 and connected movably with the body 2 with the aid of a locking screw 13. As the device moves in the direction "H" of the liquid flow, the axles 8 of the supporting rollers 5 are set at angle "$+\beta$" to this direction, said angle being read counterclockwise. As the device moves against the liquid flow, the angle "$-\beta$" between the direction "H" and the axle 8 of the supporting roller 5 will be read in a clockwise direction. The axles 8 of all the rollers 5 are set at the same angles "$\pm\beta$" to the direction "H" of the liquid flow.

The optimum angle "$\beta$" is selected depending on the density and velocity of the fluid flow in which the device moves, and on the profile of the pipeline route, reaching 30° for the preassigned direction of movement of the device. Angle "$\beta$" will be closer to minimum when the pipeline 1 carries a fluid with a low density at a slow speed, e.g. a gas.

For setting the axles 8 to the desired angle "$\beta$", the guides 10 have a radial through slot 14 (FIG. 1) accommodating a locking screw 13. In our example the turbine wheel 4 is connected with the supporting rollers 5 with the aid of the body 2 because the blades 3 of the turbine wheel 4 and the supporting rollers 5 are connected with the body 2. In this method of fastening the turbine wheel 4 and rollers 5 the body 2 rotates when the device is propelled by the flow of liquid. The length of the slot 14 allows the axle 8 of the roller 5 to turn through an angle equal to twice the angle "$\beta$".

It is possible to fasten the blades on the turbine wheel hub which, in turn, is rigidly fastened to the body.

In another version of the device for pipeline transportation of loads the blades 15 (FIGS. 3, 4) are mounted on the hub 16 at an acute angle "$a$" to the direction "H" of the liquid flow. The blades 15 and the hub 16 form a turbine wheel 17. This turbine wheel is installed on a body 18 with the aid of bearings 19. In this method of installing the turbine wheel 17 the body 18 does not rotate and can, therefore, be used as a container for the loads that must not be turned over. The hub 16 mounts one row of the supporting rollers 5 which are connected with the hub in the same way as in the above-described method of connecting the supporting rollers with the body 2.

The second row of supporting rollers 20 (FIG. 3) is installed on the body 18 so that said rollers are capable only of radial movement relative to the pipeline axis, the roller axles being perpendicular to the direction "H" of the liquid flow. The guides 21 are rigidly fixed on the body 18.

The body 18 mounts blades 22 (FIGS. 5 and 6) located horizontally at the opposite sides of said body between the rows of the supporting rollers 5 and 20. These blades have an aerodynamic profile and are mounted on the body 18 so that their backs are directed upward and the leading edge is set against the fluid flow. This setting of the blades 22 produces a lifting force thereby reducing the load on the supporting rollers 5 and 20.

The power of the device is increased by providing it with an additional turbine wheel 23 (FIG. 7) installed on body 18a after the turbine wheel 17 in the direction "H" of the fluid flow. Hub 24 of the turbine wheel 23 is fitted with an additional row of the supporting rollers 5a connected with the hub 24 in the same way as described above for the rollers 5. Having passed through the turbine wheel 17 the fluid flow changes its direction "H" for "$H_1$". Blades 25 of the turbine wheel 23 are also set on the hub 24 at an acute angle to the direction of the fluid flow "$H_1$". The turbine wheel 23 is installed together with the supporting rollers 5a of the additional row on the body 18a in the bearings 19; this allows the additional turbine wheel 23 to rotate relative to the body 18a against the direction of rotation of the turbine wheel 17.

To increase the traction force on the supporting rollers (FIG. 8) the turbine wheel 26 and the additional turbine wheel 27 are mounted on the axle 28 which interconnects the parts "a" and "b" of the body 29. These turbines are capable of rotating relative to the axis 28 of the body 29. Said turbine wheels 26 and 27 are interconnected by a differential reducing mechanism 30 and the latter is connected with all the supporting rollers 5 by bevel-gear transmissions 31 also of the reducing type.

Figure 9:
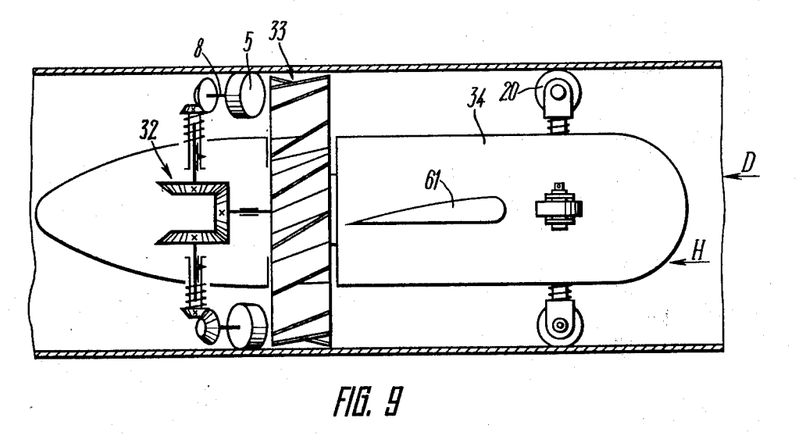
FIG. 9 is a schematic view of the device for the pipeline transportation of loads wherein the turbine wheel is connected with the supporting rollers by a kinematic chain.

As can be seen in FIG. 9, the differential mechanism 32 can be used for connecting one row of the supporting rollers 5 with one turbine wheel 33 mounted on the body 34 with a provision for rotating relative to the latter.

The device with this type of kinematic linkage between the supporting rollers 5 and the turbine wheel 33 can be employed most successfully in pipelines carrying mainly liquids, especially petroleum and petroleum products.

To prevent the supporting rollers 5 from slipping over the inside surface of the pipeline 1, said rollers are connected with the turbine wheel 35 (FIG. 10) rotatably mounted on the body 36 by means of the links of a kinematic chain. This kinematic chain incorporates a gear-type speed reducer 37. The input shaft 38 of the speed reducer is connected with the turbine wheel 35 whereas its output shaft 39, with an intermediate link 40. The intermediate link 40 is a star-shaped part with arms 41, each carrying the axle 8 of the supporting roller 5 at the end. The rollers 5 are loaded by a spring 41a to allow their radial movement with respect to the axis of the pipeline 1.

Such a kinematic layout can be utilized in the devices with an additional turbine wheel.

Figure 10:
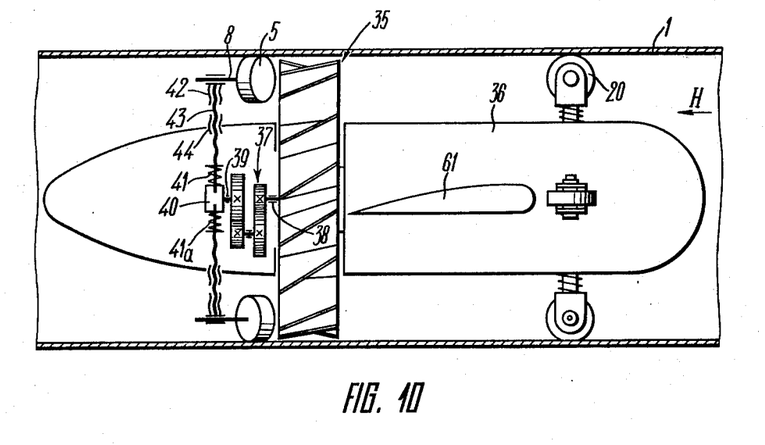
FIG. 10 — same, second version.

The inclination angle of the axles 8 of the supporting rollers 5 to the direction "H" of the fluid flow can be changed by a kinematic pair consisting of a nut 42 and a screw 43. The nut 42 is connected to the axle 8 of the roller 5 and tightened up on the screw 43 which is connected with the arm 41 of the intermediate link 40 by a key joint (not shown in the drawing). The uncontrollable turning of the nut 42 on the screw 43 is prevented by a lock nut 44.

In a still another version of the device the row of rollers comprises three rollers, viz., one roller 45 (FIG. 11) and two rollers 46. The supporting rollers 45 and 46 are connected with the turbine wheel 47 by a kinematic chain incorporating a pair of bevel gears 48 and 49. The gear 48 is fastened on the turbine wheel 47 installed rotatably on the body 50 whereas the gear 49 is mounted on an intermediate shaft 51 whose other end carries a bevel gear 52 meshing with a planetary gear 53 which is rigidly fixed on an axle 54 (FIG. 12) interconnecting the supporting rollers 46. The axle 54 is connected by a drive link 55 with the supporting roller 45. The axle 56 of the supporting roller 45 is installed in a spring-loaded intermediate part 57 which is key-jointed to the drive link 55 thus allowing the supporting rollers 45 to move radially with respect to the pipeline axis.

Figure 11:
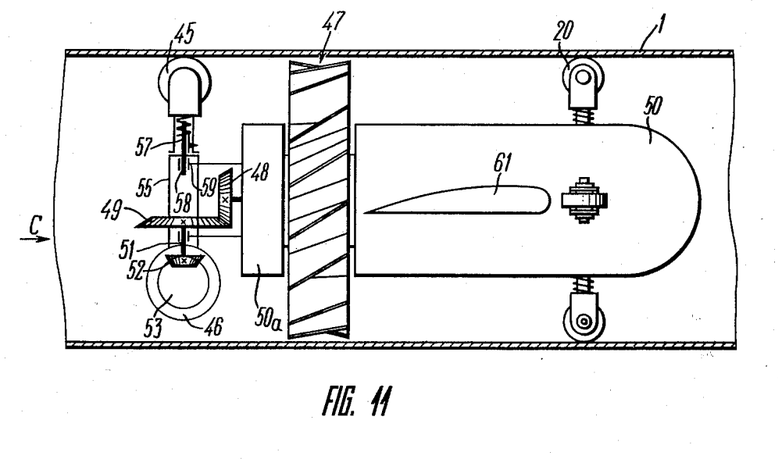
FIG. 11 — same, third version.

This connection of the supporting rollers 45 and 46 with the turbine wheel 47 makes it possible to change the angle $\beta$ between the axles 54 and 56 of the supporting rollers 46 and 45, respectively, and the direction "H" of the fluid flow and thus allows the supporting rollers to move over the internal surface of the pipeline 1 both in a straight line and spirally, either along or against the direction of fluid flow.

The angle $\beta$ between the axles 54, 56 of the rollers 46, 45, respectively, and the direction "H" of the fluid flow can be changed by turning the drive link 55 around the shaft 51 and the axle 58 installed in a bushing 59. The drive link 55 is fixed relative to the body 55 by a locking screw 60 located on the bushing 59. The bushing 59 is mounted on an element 50a installed on the body 50 so that it is capable of rotating with respect to said body when the supporting rollers 45, 46 move on a spiral line, i.e. when their axles 56 and 54 are set at an angle $\beta$ to the direction "H" of the fluid flow.

To prevent the body 34 (FIG. 9) from turning around the axis of the pipeline 1 and to build up a lifting force "P" (FIG. 13), said body 34 is provided at one side with a blade 61 of an aerodynamic profile which is secured practically in a horizontal plane with its back pointing upward and the leading edge directed against the fluid flow.

Such blades can also be installed on the devices shown in FIGS. 10, 11, 12.

Figure 14:
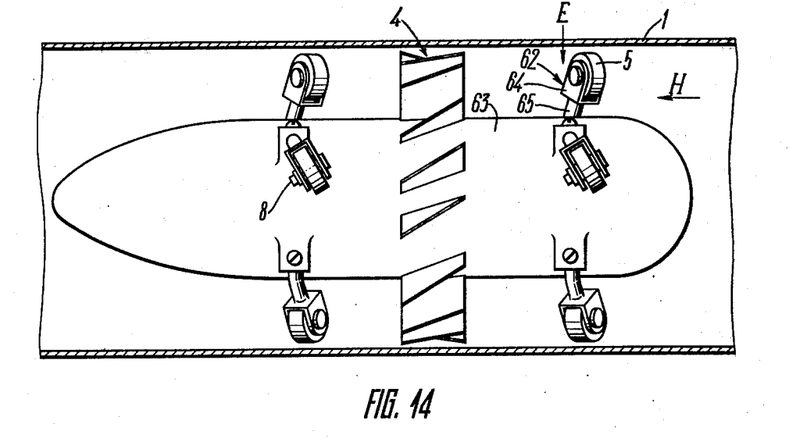
FIG. 14 is a schematic view of a device for pipeline transportation of loads with self-orienting supporting rollers in a position corresponding to the movement of the device along the fluid flow.

In one of the versions of the device for the pipeline transportation of loads the intermediate link 62 (FIG. 14) connecting each supporting roller 5 with the turbine wheel 4 through the body 63 is curved in the plane which is transverse to the axle 8 of the roller 5. One end of this intermediate link is provided with a fork 64 (FIG. 15) for mounting the axle 8 while its other end carries a trunnion 65. This trunnion serves for installing the intermediate link 62 in the body 63 which mounts the rigidly fixed blades 3 of the turbine wheel 4. As the device moves along the fluid flow as shown in FIG. 14, the intermediate link 62 is set in such a manner that its journal 65 is free to rotate around its axis for self-aligning. When the device moves against the fluid flow, the intermediate link 62 with the supporting rollers 5 are arranged so that the axles 8 of the supporting rollers 5 are set at a preassigned angle to the direction "H" of the fluid flow as shown in FIG. 16 after which the journals 65 of the intermediate links 62 are rigidly fixed on the body 63 by means of a locking bolt 66 (FIG. 17) which enters a recess on the journal 65.

Figure 18:
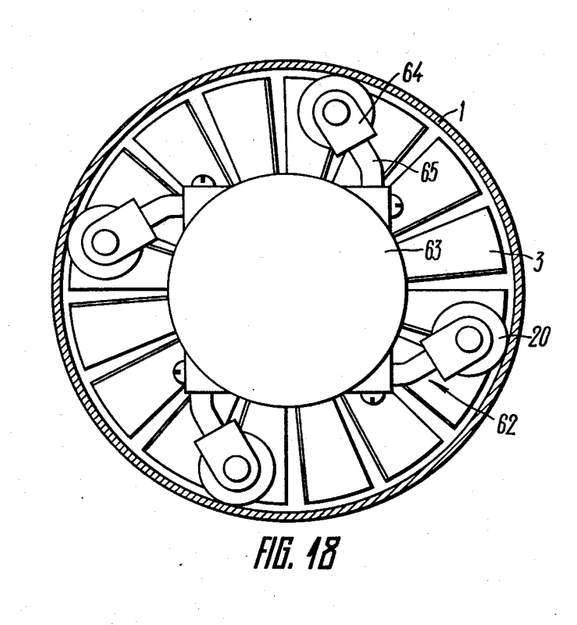
FIG. 18 is a view along arrow "J" in FIG. 16.

The intermediate links 62 (FIG. 18) which are curved in a plane transverse to the axle 8 of the supporting rollers 5 provide for the radial movement of the supporting rollers 5 relative to the axis of the pipeline 1 owing to elastic deformation of the links 62.

This method of fastening the supporting rollers 5 can also be used with the turbine wheels rotatably installed on the body.

The device for the pipeline transportation of loads by the flow of fluid functions as follows.

The first step is to set the supporting rollers 5 to suit the desired direction of movement of the device. For this purpose it is necessary to loosen the locking screw 13 thus freeing the guide 10 mounted on the body 2 of the device. The slot 14 allows the guide 10 to be turned around its geometrical axis in the body 2. At turning the guide 10 the intermediate link 6 is turned together with the axle 8 of the supporting rollers 5 owing to the key joint 12.

When the device moves against the direction "H" of the fluid flow, the axles 8 of the supporting rollers 5 are set at an angle "$-\beta$" to the direction "H" of the fluid flow; when the device moves along the direction "H" of the fluid flow, the axles 8 of the supporting rollers 5 are set at an angle "$+\beta$" which may be equal to 90°. In this case the device functions as a piston in the cylinder and is moved by the difference of fluid pressures before and after the turbine wheel 4 which in this case serves as a sealing cup.

After setting the axles 8 of the supporting rollers 5 at a preset angle, said axles are fixed in position by the locking screws 13.

It is essential that the axles 8 of all supporting rollers 5 should be set precisely at one and the same angle.

Errors in the setting of the axles 8 will cause the supporting rollers to roll over different trajectories inside the pipeline 1 thus resulting in an undue resistance to the movement of the device caused by the sliding friction of the supporting rollers 5 against the internal surface of the pipeline 1.

After setting the supporting rollers to the required position the device is placed into the pipeline 1 with the fluid flowing inside. The energy of the flow forms a force F (FIG. 1) on the blades 3 of the turbine wheel 4; said force can be resolved into a component $F_1$ directed along the rolling plane of the supporting roller 5 and a component $F_2$ which is perpendicular to said plane.

The force $F_2$ is counterbalanced by the force of friction $F_3$ originated between the supporting roller 5 and the inside surface of the pipeline 1.

As the turbine wheel 4 and, consequently, the body 2 rotate, the supporting rollers 5 rolled by the force $F_1$ move the device against the direction "H" of the fluid flow if the angle between the axle 8 and the direction "H" of the fluid flow is equal to "$-\beta$". When said angle is equal to "$+\beta$", the device will move along the direction "H" of the fluid flow.

When the speed of the device is equal to the velocity of the fluid flow and the device moves along the flow, there comes a moment when the fluid flow "H" stops exerting pressure on the blades 3 of the turbine wheel 4; in this case the force $F_1 = O$, i.e. the maximum speed of the device may be equal to the velocity of the flow "H".

When the device moves against the direction "H" of the fluid flow the effect of $F_1$ is constant while the increase in the speed of the device brings about an increase in the velocity of the flow relative to the blades 3 of the turbine wheel 4.

In this way under favourable conditions the constantly acting force, may accelerate the device to the speeds exceeding the velocity of the fluid flow.

Another version of the device (FIGS. 3 and 4) functions mainly along the similar lines as that described above.

Figure 3:
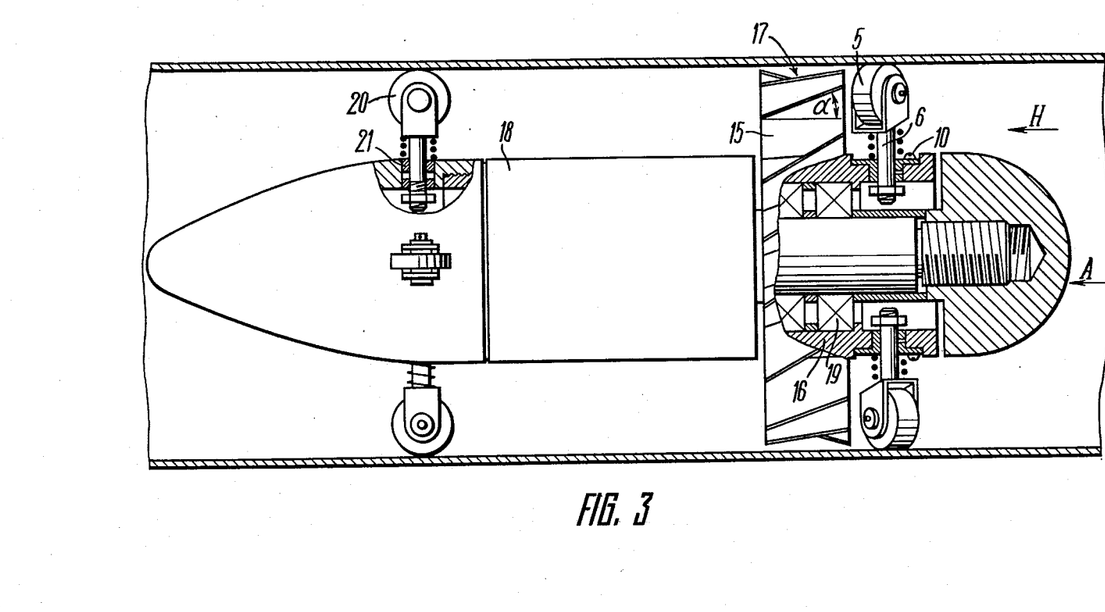
FIG. 3 shows the device for the pipeline transportation of loads according to the invention, another version.
Figure 4:
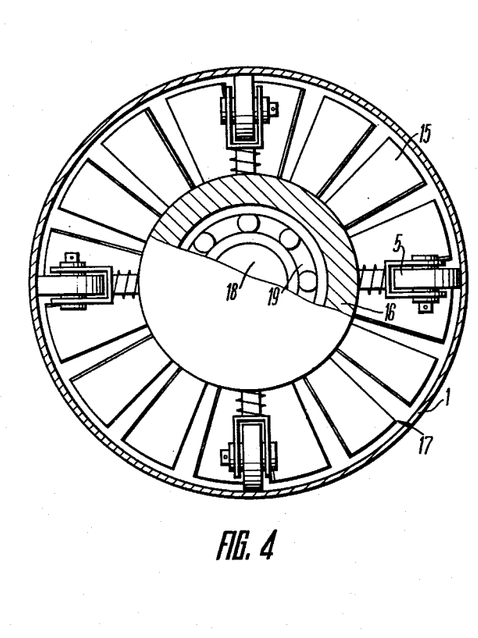
FIG. 4 is a view along arrow "A" in FIG. 3 with the supporting rollers turned for convenience through angle "$\beta$", with a partial cutout.

The body 18 is not turned and the turbine wheel 17 rotates around the body. However, a certain force of friction occurred between the bearing 19 and body 18 as well as the reaction moment created by rotation of the turbine wheel 17 may turn the body 18 too.

To rule out this undue occurrence, the body 34 of the device is fitted with a blade 61 as shown in FIGS. 9 and 13. The lifting force P created by the fluid flow passing through builds up a torque which prevents the body 34 against turning.

If necessary, the body of the device can be provided with several blades of this type so as to direct their summary torque against the direction of rotation of the body 34.

Figure 5:
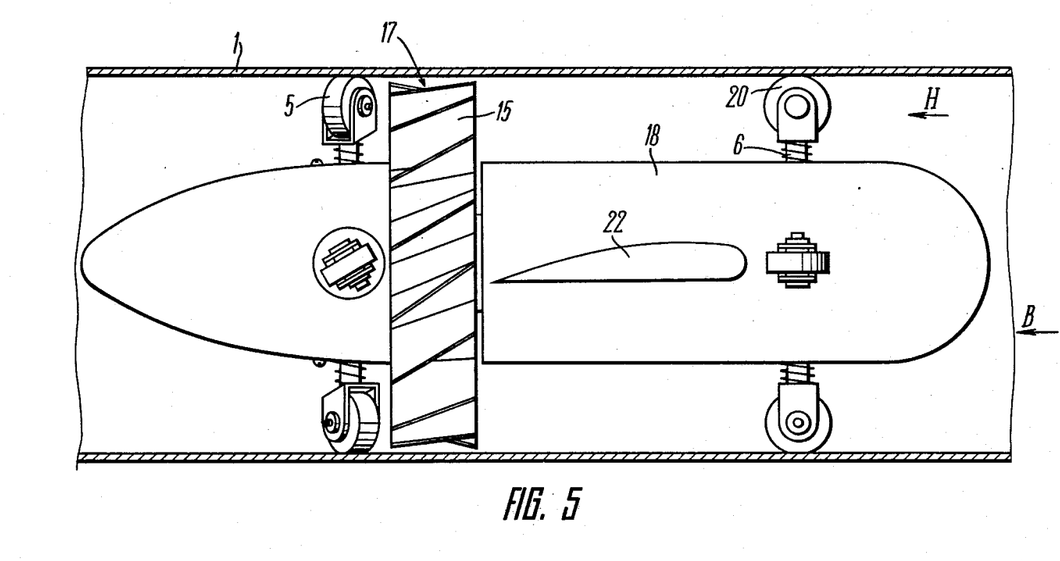
FIG. 5 shows the device for the pipeline transportation of loads with horizontal blades on the body.
Figure 6:
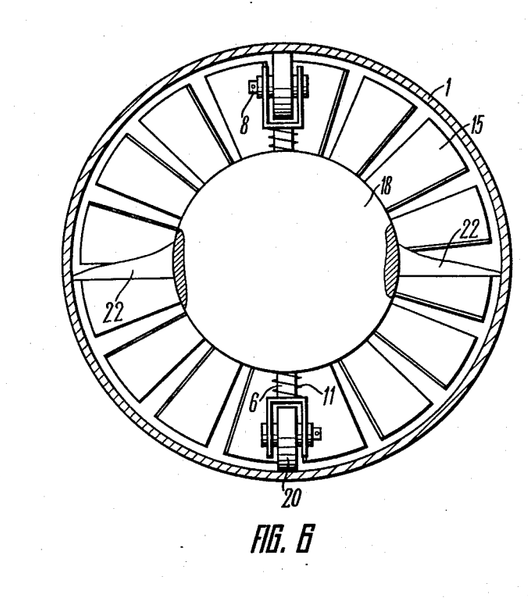
FIG. 6 is a view along arrow "B" in FIG. 5.

The body 18 of the device shown in FIGS. 5, 6 is provided with blades 22 on both sides. As the device moves through the pipeline, these blades of an aerodynamic shape create a lifting force which reduces the load on the supporting rollers 5 and 20, this being particularly important during transportation of heavy loads.

Figure 7:
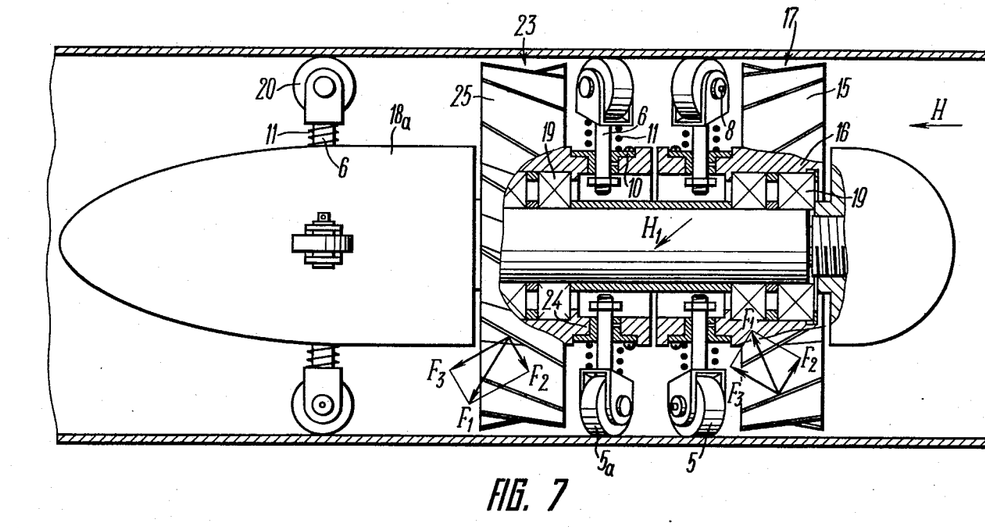
FIG. 7 shows the device for the pipeline transportation of loads with an additional turbine.

In the version of the device shown in FIG. 7 the additional turbine wheel 23 is provided with a number of supporting rollers 5a on its hub.

Passing through the turbine wheel 17 the fluid flow "H" changes its direction to $H_1$.

The flows H and $H_1$ creates forces on the blades 15 and 25; said forces produce torques which rotate the turbine wheels 23 and 17 and, respectively, the supporting rollers 5 and 5a.

In this way, owing to the provision of the additional turbine wheel 23, the energy of the fluid flow $H_1$ is utilized twice, thus increasing the traction force of the device.

The blades 15 and 25 are arranged in such a manner that the turbine wheels 17 and 23 rotate in the opposite directions. In this case the axles of the supporting rollers 5 and 5a are set at the same angle with a different sign to the direction "H" of the fluid flow. When the turbine wheels 17 and 23 rotate in opposite directions there is no torque to turn the body 18a.

Figure 8:
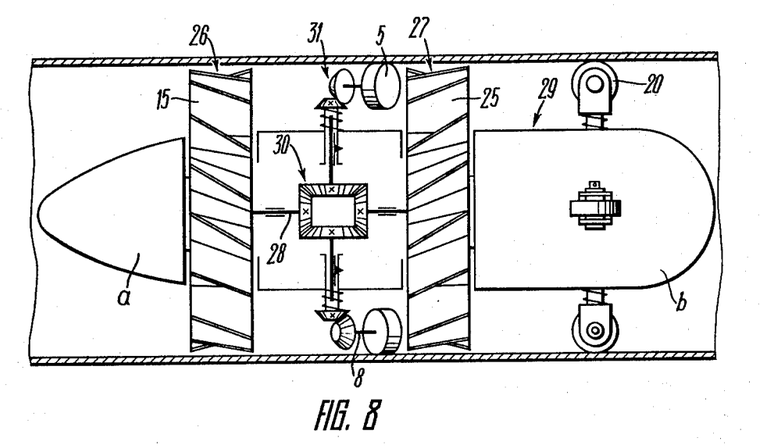
FIG. 8 is a schematic view of the device for the pipeline transportation of loads with an additional turbine and a differential mechanism connecting the turbines with the supporting rollers of one row.

In FIG. 8 the turbine wheel 26 and the additional turbine wheel 27 are free to rotate relative to the body 29 and are interconnected by a differential mechanism 30.

The traction force on the supporting rollers 5 is increased by summing up the torques developed by the turbine wheel 26 and the additional turbine wheel 27.

In the device with one turbine wheel 33 (FIG. 9), the torque can also be transmitted to the axles 8 of the supporting rollers 5 by the differential mechanism 32 which increases the traction force on the supporting rollers 5.

In the device shown in FIG. 10 the gear speed reducer 37 increases the traction force on the supporting rollers 5. To turn the axles 8 of the supporting rollers 5 to a preset angle β to the direction of the fluid flow it is necessary to back off the lock nuts 44 of the nuts 42 after which the axles 8 can be turned to the preset angle β and fixed in this position by the nuts 42 and 44.

When the device moves through difficult or steep sections of the pipeline, adjustment of the traction force and speed may prove to be an important factor in preventing the slipping of the supporting rollers 5.

The method of fastening the axles of the rollers by means of the nut 42 and screw 43 makes it possible to adjust the angle β of the axles 8 to the direction "H" of the fluid flow by remote control or automatically, by providing a system of pickups which transmit information on changes in the movement of the devices in the pipelines to the actuating mechanisms which will turn the axles 8 of the supporting rollers 5 through the required angle, first loosening then tightening the nut 42 with the aid of the lock nut 44.

In the version of the device shown in FIGS. 11 and 12 the bevel gear 48 of the turbine wheel 47 rotates the bevel gear 49, shaft 51, bevel gears 52 and 53 and axle 54 and thus transmits torque to the driving supporting rollers 46.

Unlike the above-described devices, this device can move in a pipeline against the fluid flow at a maximum speed provided the axles 54 and 56 of the supporting rollers are set at 90° to the direction of the fluid flow because at this angle the supporting rollers 45 and 46 move in a straight line.

If we turn the drive link 55 through a certain angle other than 90°, the axles 54 and 56 of the supporting rollers 46 and 45 will turn through the same angle and the supporting rollers 45 and 46 will move over the internal surface of the pipeline 1 along a spiral line in which case the element 50a will rotate around its geometrical axis which coincides with the longitudinal axis of the body 50.

The translational speed becomes lower when the device moves spirally.

Figure 15:
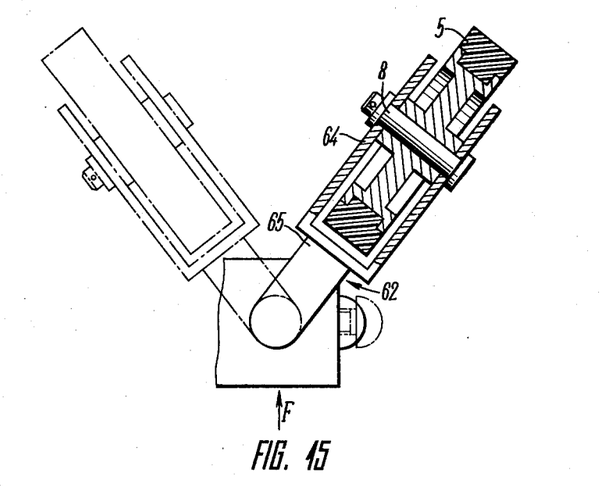
FIG. 15 shows a supporting roller, a view along arrow "E" in FIG. 14 with a partial cutout.
Figure 16:
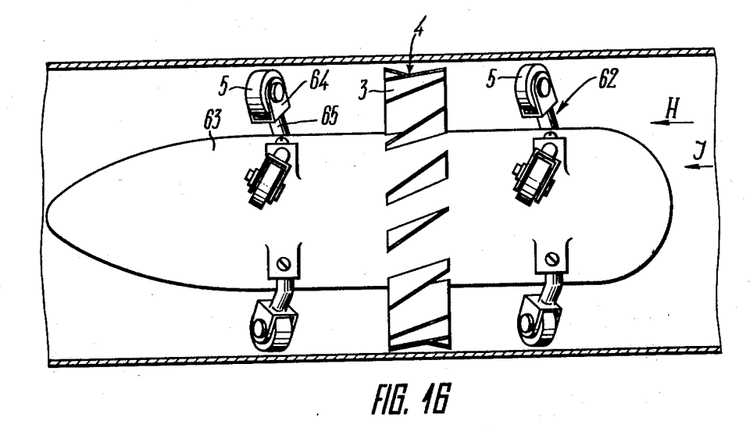
FIG. 16 is a schematic view of the device shown in FIG. 14 in a position corresponding to its movement against the fluid flow.
Figure 17:
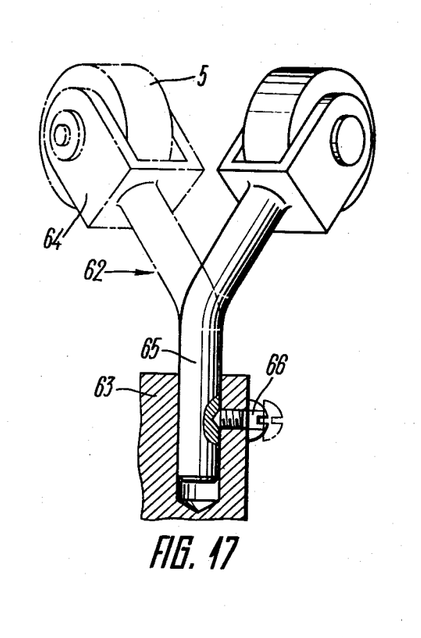
FIG. 17 shows a supporting roller, a view along arrow "F" in FIG. 15 with a partial cutout.

The body 63 of the device shown in FIGS. 15, 16, 17 is provided with intermediate links 62 which are rigidly fixed by a locking screw 66 so that the axles 8 of the supporting rollers 5 are set at an angle "−β" to the direction "H" of the fluid flow thus ensuring the movement of the device against the direction "H" of the fluid flow.

When the device moves along the direction "H" of the fluid flow (FIG. 14) the intermediate links 62 are fixed in such a position that the angle between the axle 8 and the direction "H" of the fluid flow is equal to "+β".

When the intermediate links 62 are rigidly fastened on the body 63, the supporting rollers 5 move on a spiral line with the device moving both along and against the direction "H" of the fluid flow.

After releasing the locking screws 66 and thus freeing the supporting rollers 5 on the body 63, said rollers will be able to turn on their trunnions 65 around their axes.

When the device moves along the fluid flow, such supporting rollers are capable of being self-aligned, thus choosing the path of the least resistance to the movement. An advantage of such supporting rollers lies in that they can pass-by various obstacles in the form of irregularities and bulges on the inside surface of the pipeline and avoid colliding with any hard objects that have accidentally found their way into the pipeline.

The device with nonfixed supporting rollers 5 moves along a straight line.

The loads can be transported through pipelines in containers (not shown in the drawings) with a streamlined shell mounting supporting rollers whose axles are set at an angle of 90° to the direction "H" of the fluid flow.

A number of load containers can be combined into a train wherein the device according to the invention will function as a prime mover.

It is also possible to arrange a continuous train of load containers that would incorporate a plurality of the devices (prime movers) intended to propel the train.

We claim:

1. A device for pipeline transportation of loads by the flow of fluid comprising: a body; a turbine wheel mounted on said body; blades of said turbine wheel set at an acute angle to the direction of the fluid flow; supporting rollers arranged at least in two rows and capable of moving radially with respect to the pipeline axis; said supporting rollers of at least one row mechanically linked with said turbine wheel; said supporting rollers of the other row mounted on said body; axles of said supporting rollers connected with said turbine wheel and set at an angle to the direction of the fluid flow, the value of said angle depending on the direction of movement of the device in the fluid flow.

2. A device according to claim 1, wherein in the device moving against the fluid flow the angle between the axle of each supporting roller and the direction of the fluid flow is not over 30°.

3. A device according to claim 1, wherein the turbine wheel is fastened on the body and the axles of the supporting rollers in one row are also connected with the body through intermediate links.

4. A device according to claim 3, wherein the intermediate link connecting the axle of each supporting roller with the turbine wheel is made in the form of a part curved in the plane transverse to the axle of the supporting roller and provided at one end with a fork for fastening said axle while its other end has a journal installed in the turbine wheel with a provision for turning around its axle when the device moves along the fluid flow and being rigidly fixed on said wheel when the device moves against the direction of fluid flow.

5. A device according to claim 1, wherein the turbine wheel is mounted on the body with a provision for rotating around the latter.

6. A device according to claim 5, wherein the axle of each supporting roller in one row is connected with the turbine wheel through an intermediate link.

7. A device according to claim 6, wherein the intermediate link connecting the axle of each supporting roller with the turbine wheel is made in the form of a part curved in the plane transverse to the axle of the supporting roller and provided at one end with a fork for fastening said axle while its other end has a journal installed in the turbine wheel with a provision for turning around its axle when the device moves along the fluid flow and being rigidly fixed on said wheel when the device moves against the direction of fluid flow.

8. A device according to claim 5, wherein the body is provided with one blade arranged at each side in a horizontal plane, with the blade backs directed upward and the leading edges set against the flow of fluid.

9. A device according to claim 5, wherein the body mounts an additional turbine wheel installed after the main turbine wheel in the direction of fluid flow with a provision for rotating relative to said body and there is an additional row of supporting rollers whose axles are connected with said additional turbine wheel through intermediate links.

10. A device according to claim 5, wherein the body mounts an additional turbine wheel after the main turbine wheel in the direction of fluid flow, said additional turbine wheel being capable of rotating relative to said body and being connected by a differential mechanism with said main turbine wheel and with the axles of the supporting rollers in one row.

11. A device according to claim 1, wherein the turbine wheel is connected with the axles of the supporting rollers in one row through the links of a kinematic chain.

12. A device according to claim 11, wherein the body is provided at one side, essentially in a horizontal plane, with a blade whose back points upward and the leading edge is directed against the fluid flow.

* * * * *